P. J. GAFFNEY.
COUPLING.
APPLICATION FILED JUNE 29, 1911.
1,021,833.
Patented Apr. 2, 1912.
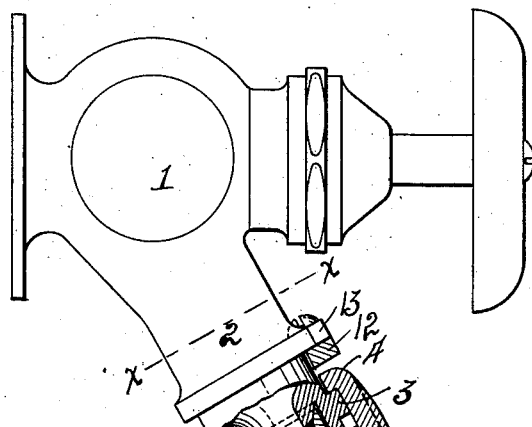
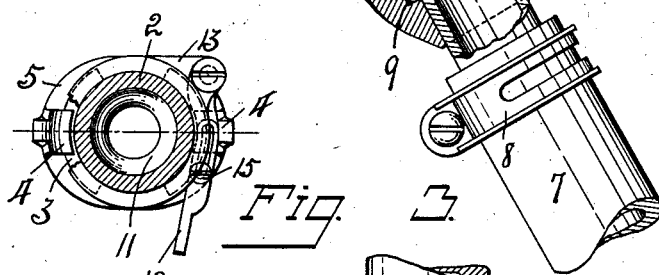
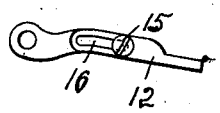
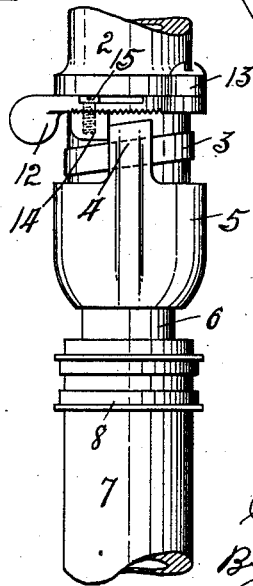
WITNESSES:
INVENTOR.

UNITED STATES PATENT OFFICE.

PATRICK J. GAFFNEY, OF TOLEDO, OHIO.

COUPLING.

1,021,833.

Specification of Letters Patent.

Patented Apr. 2, 1912.

Application filed June 29, 1911. Serial No. 636,066.

*To all whom it may concern:*

Be it known that I, PATRICK J. GAFFNEY, a citizen of the United States, and a resident of Toledo, in the county of Lucas and State of Ohio, have invented a certain new and useful Coupling; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates particularly to a hose and faucet or sill-cock coupling, but is not restricted to such use as it may be used in any connection for which it may be adapted or appropriate.

The object of my invention is to provide an improved coupling of the character described, which is simple, strong and durable in its construction, inexpensive of manufacture, and easily and quickly operable to connect or disconnect a hose and sill-cock, or the like, and which, when connected forms a double water tight joint between the connected parts.

The invention is fully described in the following specification, and a preferred embodiment thereof is illustrated in the accompanying drawing, in which,—

Figure 1 is a side elevation of a sill-cock, or the like, and portion of a hose coupled thereto, with the coupling embodying my invention in section. Fig. 2 is a cross-section on the line *x x* in Fig. 1, with a part broken away. Fig. 3 is a side elevation of the coupling; and Fig. 4 is a detail of the locking pawl thereof.

Referring to the drawings, 1 designates a sill-cock or other type of faucet adapted for the attaching of a hose or the like thereto, and is shown as having its discharge nipple 2 formed near its end on opposite sides thereof with spirally disposed segmental flanges 3, with which the inwardly hooked fingers 4 of the coupling member 5 engage as hereinafter described. The coupling member 5 is mounted for free rotary movements upon a nipple 6 projecting from the end of a hose 7 or other member to be coupled to the cock, being secured at one end within said hose end, as by an external clamp 8. The outward movement of the member 5 upon the nipple 6 is stopped by an annular shoulder 9 on said nipple. The free end of the nipple 6 extends beyond said shoulder and is adapted to project within the end of the cock nipple 2. The movement of the nipple 6 within the nipple 2 is limited by the end of the latter seating against a gasket 10 on the shoulder 9, and also by reason of the end of the nipple 6 seating against a conical internal shoulder 11 within the nipple 2, thus providing a double joint between the two parts. The conical shoulder 11 preferably fits within the end of the nipple 6, such end being provided with a complemental conical receiving surface for such purpose.

In coupling the parts 2 and 6 together, the latter is inserted to its seat within the former and the fingers 4 of the coupling member 5 are slipped up between the ends of the segmental spiral flanges 3, the coupling being then turned to cause said fingers to coöperate with the flanges to exert a wedge or screw-like tightening action upon the parts 2—6 to draw them closely to their seats, as is apparent.

For the purpose of preventing an accidental loosening of the coupling member 5 upon the part 2 when tightened thereon, a pawl 12 is pivoted to a lug or flange 13 on the part 2 above the flanges 3 and is provided on a side thereof with a lug 14, which it suitably positioned relative to a finger 4 of the coupling member when in tightened position to enable it to engage the rear side of such finger to prevent a loosening or unturning movement of said member, as shown. To permit of an adjustment of the lug 14 relative to its pawl 12 to compensate for wear or to secure a proper positioning of the same relative to a finger 4 of the coupling member, the lug 14 is separate from the pawl 12 and held in adjusted position thereto by a screw 15, which works through a slot 16 provided longitudinally in the pawl and threads into the lug. The coacting surfaces of the lug and pawl are roughened or serrated to facilitate a rigid clamping of one to the other.

It is apparent that I have provided a simple and easily operated coupling for connecting hose to sill-cocks or the like, which coupling, in addition to forming a double joint between the connected parts, is also provided with means for preventing an accidental loosening or disconnecting of the coupled parts.

I wish it understood that my invention is not limited to any specific construction and arrangement of the parts except in so far as such limitations are specified in the claims.

Having thus described my invention, what I claim as new, and desire to secure by Letters Patent, is,—

1. In combination, a cock having its discharge nipple provided with segmental spiral flanges, a part for connecting to said nipple, a coupling member rotatably carried by said part and having fingers for coöperating with said flanges to effect a tightening of the part and nipple when the coupling member is turned in one direction in engagement with said flanges, and a pawl pivoted to said nipple transversely thereof and adapted to coact with a finger on said member to hold said member in tightened position.

2. In combination, a cock having its discharge nipple provided with segmental spiral flanges, a part for connecting to said nipple, a coupling member rotatably carried by said part and having fingers for coöperating with said flanges to effect a drawing together and tightening of the parts when the coupling member is turned in one direction in engagement with and relative to said flanges, a pawl carried by said nipple, and a lug adjustably carried by the pawl for engaging a side of one of said fingers when the coupling member is in tightened position and coöperating with the pawl to hold said member in tightened position.

In testimony whereof, I have hereunto signed my name to this specification in the presence of two subscribing witnesses.

PATRICK J. GAFFNEY.

Witnesses.
C. W. OWEN,
E. E. THOMAS.

---

Copies of this patent may be obtained for five cents each, by addressing the "Commissioner of Patents. Washington, D. C."